No. 828,485. PATENTED AUG. 14, 1906.
W. KEENAN.
PROCESS OF MAKING AIR HOLE GLASSWARE.
APPLICATION FILED MAR. 17, 1906.
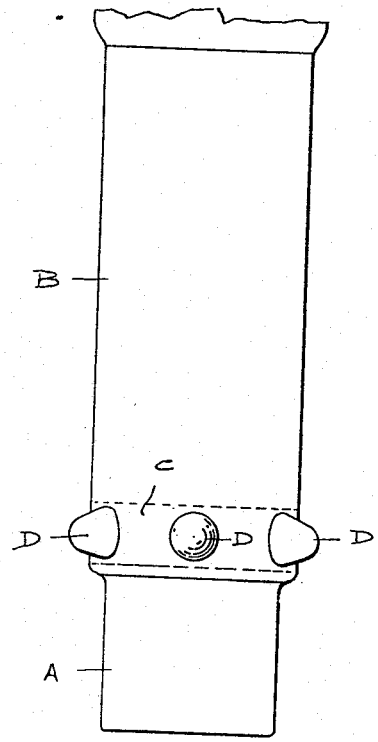
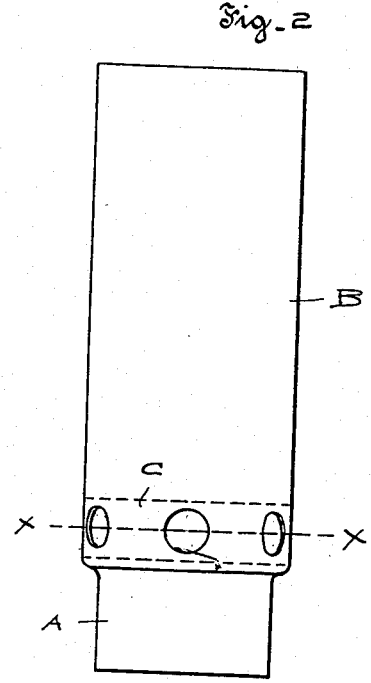
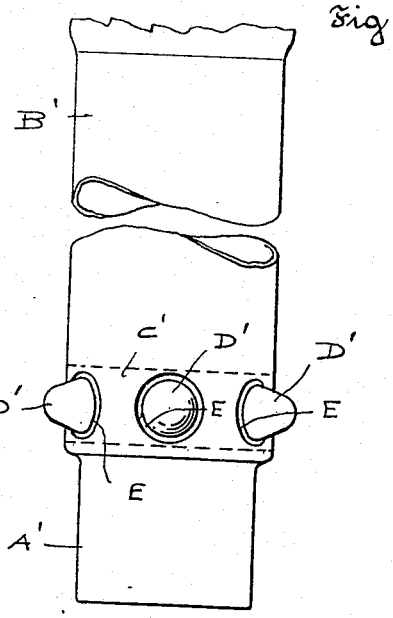
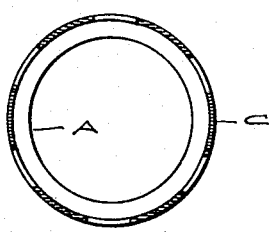
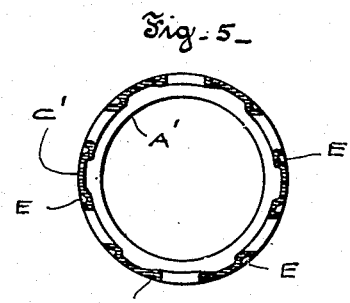

UNITED STATES PATENT OFFICE.

WILLIAM KEENAN, OF TOLEDO, OHIO, ASSIGNOR OF ONE-HALF TO BERNARD C. GILLIGAN, OF TOLEDO, OHIO.

PROCESS OF MAKING AIR-HOLE GLASSWARE.

No. 828,485. Specification of Letters Patent. Patented Aug. 14, 1906.

Application filed March 17, 1906. Serial No. 306,628.

*To all whom it may concern:*

Be it known that I, WILLIAM KEENAN, a citizen of the United States, residing at Toledo, in the county of Lucas and State of Ohio, have invented a new and useful Process of Making Air-Hole Glassware, of which the following is a specification.

My process of making air-hole glassware consists in blowing glassware having mold-polished portions and one or more annular portions unpolished and studded with horns or protuberances, annealing said ware, fitting, removing said horns or protuberances, and finishing the edges in suitable manner.

A species of glassware produced by my process is illustrated in the drawings, in which—

Figure 1 is an elevation of a lamp-chimney as formed in a mold. Fig. 2 is a like view showing the chimney fitted and the horns or protuberances removed. Fig. 3 is a plan section on line X X of Fig. 2. Fig. 4 is an elevation of a chimney, showing the base of the horns or protuberances annularly indented; and Fig. 5 is a plan section showing the horns or protuberances removed.

A and B, respectively, designate the socket and the shaft of the lamp-chimney, being mold-polished during the blowing operation, and are separated by an integral portion C, unpolished and studded with protuberances D. Said unpolished portion C has a wall of a thickness equal to the portions A and B, but with the protuberances blown out thin. The glassware thus formed is annealed and fitted to size by removing the extreme ends of A and B. The protuberances are now removed and the edges around the holes are glazed. The horns or protuberances may be removed by grinding and the edges glazed.

The chimney illustrated in Figs. 4 and 5 has its protuberances D' formed centrally of indents E, annular to the base of the protuberances. Said indents serve as reinforcement around the holes and provide additional material for glazing the edges after the protuberances are removed.

What I claim is—

1. The process of making air-hole glassware consisting in blowing on mold-polished ware, an annular unpolished portion studded with protuberances, annealing said ware, fitting, removing the protuberances, grinding the rough edges and glazing.

2. The process of making air-hole glassware consisting in blowing on mold-polished ware, an annular unpolished portion studded with parallel protuberances, annealing, fitting, removing said protuberances, grinding the rough edges and glazing.

3. The process of making air-hole glassware consisting of blowing on mold-polished ware an annular unpolished portion studded with protuberances, said protuberances being each formed with an annular base-indent, annealing said ware, fitting, removing the protuberances and glazing the edges.

4. The process of making air-hole glassware consisting in blowing glassware having mold-polished portions and an integral unpolished portion studded with protuberances, annealing said ware, fitting, removing said protuberances and finishing the edges.

In testimony whereof I have set my hand this 15th day of March, 1906.

WILLIAM KEENAN.

Witnesses:
EDWARD N. METTLER,
PETER J. METTLER.